(12) United States Patent
Yoshimoto

(10) Patent No.: US 7,869,325 B2
(45) Date of Patent: Jan. 11, 2011

(54) OPTICAL DISC APPARATUS AND METHOD OF FOCUS BALANCE ADJUSTMENT

(75) Inventor: Tadafumi Yoshimoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 553 days.

(21) Appl. No.: 11/937,277

(22) Filed: Nov. 8, 2007

(65) Prior Publication Data
US 2008/0130451 A1    Jun. 5, 2008

(30) Foreign Application Priority Data
Nov. 8, 2006   (JP) .............................. 2006-302916

(51) Int. Cl.
G11B 7/00    (2006.01)
(52) U.S. Cl. ................................. 369/53.34
(58) Field of Classification Search ........................ None
See application file for complete search history.

(56) References Cited

U.S. PATENT DOCUMENTS

| | | | | |
|---|---|---|---|---|
| 5,610,886 A | * | 3/1997 | Hayashi et al. | 369/44.29 |
| 5,682,372 A | * | 10/1997 | Yamakawa et al. | 369/94 |
| 5,751,675 A | * | 5/1998 | Tsutsui et al. | 369/44.27 |
| 5,808,983 A | | 9/1998 | Tsutsui et al. | |
| 6,339,580 B1 | * | 1/2002 | Kawashima et al. | 369/124.01 |
| 6,731,573 B2 | * | 5/2004 | Takeda | 369/44.29 |
| 6,747,924 B1 | * | 6/2004 | Muramatsu | 369/44.29 |
| 7,433,286 B2 | * | 10/2008 | Ogura et al. | 369/53.34 |
| 7,558,177 B2 | * | 7/2009 | Ogura et al. | 369/59.22 |
| 2002/0159345 A1 | * | 10/2002 | Mashimo et al. | 369/44.29 |
| 2006/0092797 A1 | * | 5/2006 | Mitsuda | 369/53.12 |
| 2006/0208766 A1 | * | 9/2006 | Ogura et al. | 327/12 |

FOREIGN PATENT DOCUMENTS

| | | |
|---|---|---|
| JP | 6-243496 | 9/1994 |
| JP | 2001-307332 | 11/2001 |
| JP | 2005-216461 | 8/2005 |
| JP | 2005-346802 | 12/2005 |
| JP | 2006-134516 | 5/2006 |
| JP | 2008-4152 | 1/2008 |

OTHER PUBLICATIONS

Patent Abstracts of Japan for Japanese Publication No. 06-243496, Publication date Sep. 2, 1994 (2 pages).
Patent Abstracts of Japan for Japanese Publication No. 2001-307332, Publication date Nov. 2, 2001 (2 pages).

(Continued)

*Primary Examiner*—Peter Vincent Agustin
(74) *Attorney, Agent, or Firm*—Osha • Liang LLP

(57) ABSTRACT

While reproducing information on an optical disc, an optical disc apparatus varies a focus balance value in both positive and negative directions from a currently set value thereof by ±a which will not affect reproduction operation, measures jitter levels c and d of a reproduced signal when the focus balance value is varied in the positive and negative directions, and calculates a difference e=c−d between the measured jitter levels. If this difference e exceeds a threshold value f, the optical disc apparatus varies the focus balance value by a specified amount g in a direction in which the difference e approaches 0, thereby updating the current focus balance value.

8 Claims, 6 Drawing Sheets

OTHER PUBLICATIONS

Patent Abstracts of Japan for Japanese Publication No. 2005-216461, Publication date Aug. 11, 2005 (1 page).
European Search Report dated Mar. 31, 2008 (6 pages), dated Mar. 4, 2008.
Japanese Office Action for Japanese Application No. 2006-302916, mailed on Oct. 7, 2008 (7 pages).
Patent Abstracts of Japan for Japanese Publication No. 2005-346802, Publication date Dec. 15, 2005 (1 page).
Patent Abstracts of Japan for Japanese Publication No. 2006-134516, Publication date May 25, 2006 (1 page).
Patent Abstracts of Japan for Japanese Publication No. 2008-004152, Publication date Jan. 10, 2008 (1 page).

* cited by examiner

OPTICAL DISC APPARATUS AND METHOD OF FOCUS BALANCE ADJUSTMENT

BACKGROUND OF THE INVENTION

1. Field of the Invention

The present invention relates generally to an optical disc apparatus like a digital versatile disc (DVD) recorder and, more particularly, to a technique for automatically adjusting focus balance during recording and reproduction of information on an optical disc.

2. Description of the Related Art

An optical disc apparatus is so configured as to project laser light from an optical pickup onto an optical disc, produce a detection signal by picking up part of the laser light reflected from the optical disc, and perform focus control of the optical pickup based on the detection signal. The optical disc apparatus adjusts focus balance to ensure that focus control operation be executed under optimum conditions to achieve high accuracy recording and reproduction. The focus balance is a balance of an S-curve which represents a characteristic of a focus error signal produced from the reflected laser light from the optical disc. The focus balance can be varied by adjusting gain of a photodetection amplifier or by adjusting an offset value. As an example, focus balance adjustment is accomplished by measuring jitter of a reproduced signal and adjusting the focus balance to obtain a focus balance value at which the jitter is minimized, where the jitter is temporal variation of a reproduced clock signal from a reference clock signal.

Some previously known arrangements for performing focus balance adjustment are found in Japanese Laid-open Patent Application Nos. 1994-243496, 2001-307332 and 2005-216461, for example.

The arrangement disclosed in Japanese Laid-open Patent Application No. 1994-243496 is to generate a difference value signal representing differences between peak and bottom levels of a radio frequency (RF) signal, forcibly defocus a laser beam in two opposite directions (positive and negative directions) by a specified amount from a convergence point in a focus servo loop, and adjust levels of the difference value signal so that positive and negative levels of the difference value signal would be equalized to thereby accomplish the focus balance adjustment.

The arrangement proposed in Japanese Laid-open Patent Application No. 2001-307332 is to vary a focus balance value in specified steps to determine primary jitter amounts which are the amounts of jitter obtained at different focus balance values, calculate a secondary jitter amount by averaging the primary jitter amount for each focus balance value and the primary jitter amounts corresponding at least to values of an adjustment parameter immediately preceding and following the primary jitter amount, and adjust the focus balance value based on the secondary jitter amount thus calculated.

The arrangement described in Japanese Laid-open Patent Application No. 2005-216461 is to measure the amounts of jitter at different focus balance values while varying the focus balance value, measure tracking error signal values at different focus balance values while varying the focus balance value if a difference between maximum and minimum measured values of jitter is equal to or less than a specified value, and set the focus balance value at a value at which the tracking error signal value is maximized.

Typically, an optimum focus balance value does not remain constant all along a circumferential direction of an optical disc. Also, inner and outer tracks of the optical disc have different optimum focus balance values due to warpage of the disc or aberration of an optical pickup in many cases. In addition, the optimum focus balance value can vary due to tilt control operation which is performed to control tilting of the disc. Therefore, if the optical disc is poor in quality with great warpage, the focus balance value may deviate from the optimum value, making it impossible to correctly record and reproduce information on the disc, even when the tilt control operation is carried out.

Furthermore, even when an attempt is made to measure jitter level of a reproduced signal in real time and automatically adjust the focus balance value in accordance with variations in the jitter level, the optimum focus balance value can vary in different directions from one optical disc to another, and from one disc drive to another. The focus balance value may increase from the inner tracks to the outer tracks on one disc or decrease from the inner tracks to the outer tracks on another disc. There can also be a case where the focus balance value once increases and then decreases from the inner tracks to the outer tracks. It is therefore impossible to adjust the focus balance value to an optimum value based simply on jitter variations.

For reasons discussed above, conventional optical disc apparatuses have a problem that it is often impossible to automatically adjust the focus balance value to an optimum value all along the circumferential direction of an optical disc and to correctly record and reproduce information on low-quality discs having warpage. Nevertheless, none of conventional technologies including the arrangements of the aforementioned Japanese Laid-open Patent Applications provide a solution to this problem of the prior art.

SUMMARY OF THE INVENTION

The present invention is intended to overcome the aforementioned problem of the prior art. Accordingly, it is an object of the invention to provide a technique which makes it possible to automatically adjust a focus balance value to an optimum value all along tracks of an optical disc so that information can be recorded and reproduced on the disc with high quality.

In one aspect of the invention, an optical disc apparatus which is configured to project laser light from an optical pickup onto an optical disc, detect part of the laser light reflected from the optical disc and perform focus control of the optical pickup based on a detection signal thus obtained measures assessment values during reproduction operation based on signals reproduced when a focus balance value is varied in both positive and negative directions from a currently set value thereof by an amount which does not affect the reproduction operation, calculates a difference between the assessment values thus measured, and updates the current focus balance value by varying the same in a direction in which the calculated difference between the assessment values approaches 0 if this difference exceeds a specified threshold value.

For the reproduction operation, jitter level of a reproduced signal, or amplitude of an RF signal, a tracking error signal or a wobble signal may be used as the assessment value, for instance.

In another aspect of the invention, an optical disc apparatus which is configured to project laser light from an optical pickup onto an optical disc, detect part of the laser light reflected from the optical disc and perform focus control of the optical pickup based on a detection signal thus obtained measures assessment values during recording operation based on signals recorded when a focus balance value is varied in both positive and negative directions from a currently set value thereof by an amount which does not affect the recording operation, calculates a difference between the assessment values thus measured, and updates the current focus balance value by varying the same in a direction in which the calculated difference between the assessment values approaches 0 if this difference exceeds a specified threshold value.

For the recording operation, the amount of total reflected light may be used as the assessment value, for instance.

According to the present invention, the optical disc apparatus automatically updates the focus balance value to an optimum value all along inner tracks to outer tracks of an optical disc while recording or reproducing information thereon. This arrangement of the invention makes it possible to correctly record and reproduce the information even on warped discs, thereby ensuring improved quality of recording and reproduction operations.

These and other objects, features and advantages of the invention will become more apparent upon a reading of the following detailed description in conjunction with the accompanying drawings.

DETAILED DESCRIPTION OF THE PREFERRED EMBODIMENT OF THE INVENTION

Figure 1:
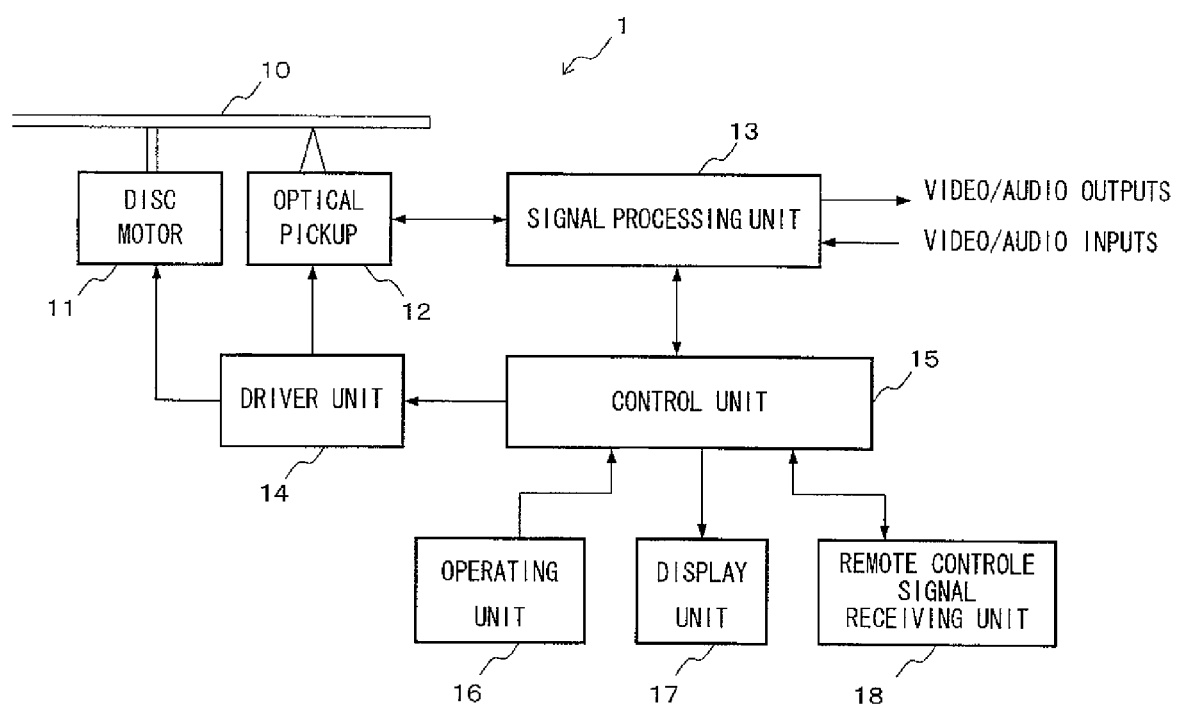
FIG. 1 is a block diagram of an optical disc apparatus according to an embodiment of the invention.

A preferred embodiment of the present invention is now described in detail with reference to the accompanying drawings. FIG. 1 is a block diagram of an optical disc apparatus 1 according to the embodiment of the invention.

Referring to FIG. 1, designated by the reference numeral 10 is an optical disc, such as a compact disc (CD) or a DVD, designated by the reference numeral 11 is a disc motor for turning the optical disc 10, and designated by the reference numeral 12 is an optical pickup for projecting laser light onto the optical disc 10 and receiving part of the laser light reflected therefrom. Designated by the reference numeral 13 is a signal processing unit which processes an RF signal (reproduced signal) output from the optical pickup 12 and outputs reproduced video and audio signals, or processes externally input video and audio signals and outputs a signal to be recorded on the optical disc 10 to the optical pickup 12. The signal processing unit 13 serves also to generate a focus error signal used for focus control as well as a tracking error signal used for tracking control.

Designated by the reference numeral 14 is a driver unit for driving the disc motor 11 and the optical pickup 12, and designated by the reference numeral 15 is a control unit including a central processing unit (CPU) and a memory for performing overall control of the optical disc apparatus 1. The control unit 15 performs focus control and tracking control of the optical pickup 12 via the driver unit 14 based on the focus error signal and the tracking error signal fed from the signal processing unit 13, respectively.

Referring again to FIG. 1, designated by the reference numeral 16 is an operating unit provided on an operator panel, designated by the reference numeral 17 is a display unit for indicating various kinds of information, and designated by the reference numeral 18 is a remote control signal receiving unit for receiving signals emitted from an unillustrated remote controller.

In the optical disc apparatus 1 thus structured, the signal processing unit 13 serves as measuring devices mentioned in the appended claims while the control unit 15 serves as both calculators and updaters mentioned therein.

Discussed below is how the optical disc apparatus 1 of the embodiment automatically adjusts a focus balance value.

Figure 2:
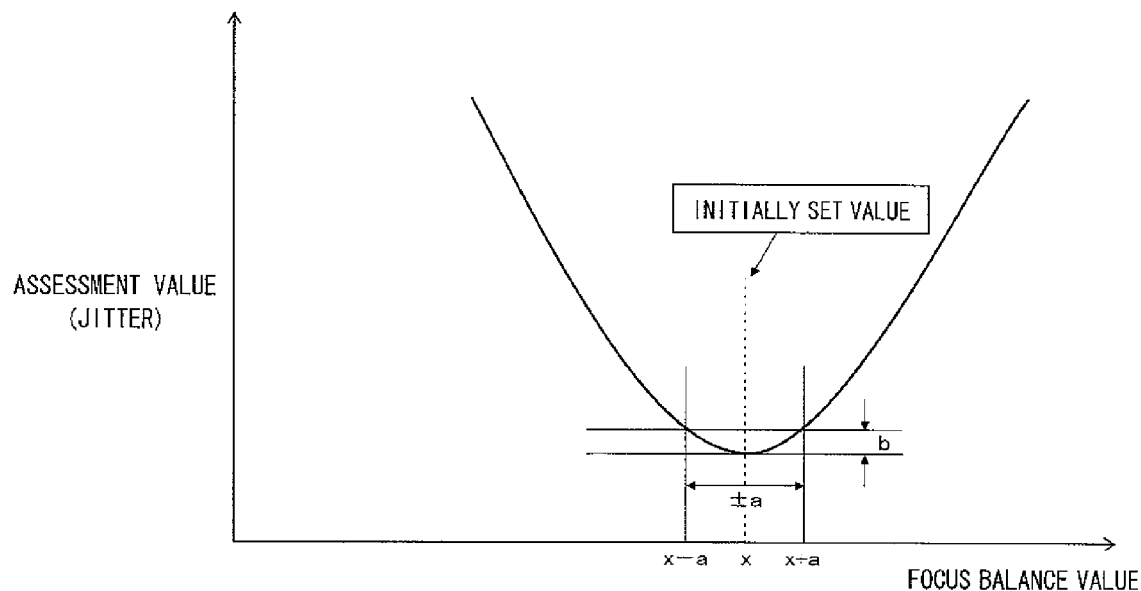
FIG. 2 is a diagram showing how a focus balance value is initially set for reproduction of information.
Figure 3:
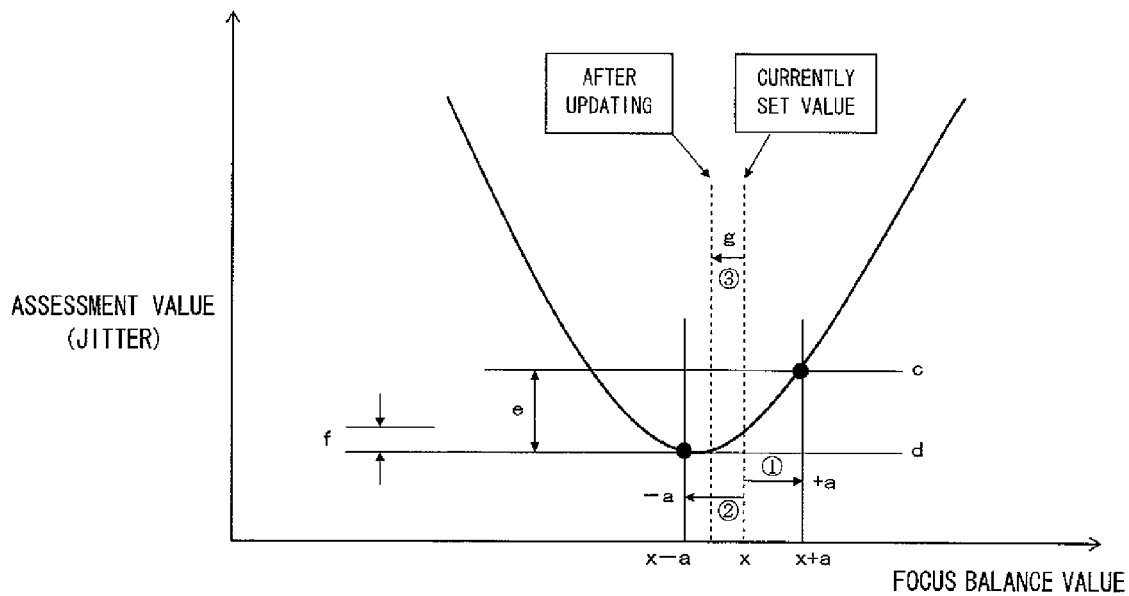
FIG. 3 is a diagram showing how focus balance adjustment is carried out during reproduction operation.

FIGS. 2 and 3 are diagrams illustrating a principle of focus balance adjustment performed during reproduction of information on the optical disc 10. FIG. 2 shows how the focus balance value is initially set for reproduction of the information. When the optical disc apparatus 1 spins up at booting, the optical pickup 12 projects laser light onto the optical disc 10 and, while the focus balance value is varied, the signal processing unit 13 measures the amount of jitter of the reproduced signal obtained from the reflected light from the optical disc 10, whereby the optical disc apparatus 1 determines a point where the jitter is minimized. The amount of jitter is an example of an assessment value used in reproduction operation in this invention. As depicted in FIG. 2, the jitter is minimized when the focus balance value is equal to x, so that this focus balance value x is used as an initially set value. Then, the optical disc apparatus 1 determines a range x±a in which the jitter varies by an amount of b when the focus balance value is varied in both positive and negative directions from the initially set value x, where b is set within a range in which the reproduction operation is not affected and values of x, a and b are stored in the memory of the control unit 15. At this point, initial setting of the focus balance value is completed.

Focus balance adjustment during the reproduction operation is now described with reference to FIG. 3. When the reproduction operation begins, the control unit 15 varies the focus balance value in the positive direction by +a from the currently set value (which is currently equal to the initial value x) as indicated by the circled numeral 1 in FIG. 3 and in the negative direction by −a as indicated by the circled numeral 2. As will be understood from the above discussion, "a" is set to a value at which the reproduction operation is not affected. The signal processing unit 13 measures the jitter at both upper and lower limits of the range x±a. In an example shown in FIG. 3, the amount of jitter is c when the focus balance value is set to x+a and the amount of jitter is d when the focus balance value is set to x−a. The control unit 15 calculates a difference e=c−d between these amounts of jitter and, if the value e exceeds a threshold value f, the control unit 15 shifts the current focus balance value x by a specified amount g in a direction in which the value e approaches 0 as indicated by the circled numeral 3, thereby updating the focus balance value. The focus balance value thus updated (x−g in this example) is now a new current focus balance value. After the new current focus balance value is determined, the control unit 15 again varies the new focus balance value in the positive direction by +a and in the negative direction by −a, and the signal processing unit 13 measures the amount of jitter at both the upper and lower limits of the range x±a. Then, if the difference e between the measured amounts of jitter exceeds the threshold value f, the control unit 15 again updates the current focus balance value by shifting the same by the specified amount g. If the difference e does not exceed the threshold value f, on the contrary, the control unit 15 holds the current focus balance value as it is without updating.

While scanning the optical disc 10 all the way from inner tracks to outer tracks thereof, the optical disc apparatus 1 continually updates the focus balance value in real time to automatically adjust the focus balance by repeating the aforementioned sequence until the reproduction operation is completed.

The jitter exhibits a characteristic represented roughly by a quadratic curve when the focus balance value is varied. Therefore, the amount of jitter does not vary so greatly when the focus balance value is altered to some extent around an optimum value thereof, while a small change in the focus balance value can result in a large variation in the amount of jitter and consequent deterioration of data reproduction performance when the focus balance value is set apart from the optimum value. For this reason, the control unit 15 varies the current focus balance value in both the positive and negative directions within the range in which the reproduction operation is not affected and the control unit 15 updates the focus balance value by shifting the same in the direction in which the value e approaches 0 when the difference e between the measured amounts of jitter exceeds the threshold value f as discussed above. This approach of the invention serves to suppress variations in the amount of jitter and prevent deterioration of the data reproduction performance. Additionally, this approach makes it possible to prevent rapid variations in the focus balance value since the focus balance value is updated by the specified amount g at one time. The aforementioned value of g should preferably be so selected that the amounts of changes in the jitter in the positive and negative directions obtained after the focus balance value is updated would become equal to each other.

The optical disc apparatus 1 need not necessarily carry out the above-described automatic adjustment of the focus balance value in the reproduction operation when reproducing control information recorded on inner tracks of the optical disc 10. Also, the threshold value f may be set to a fixed value and stored in the memory of the control unit 15 in advance or determined in accordance with results of adjustment of the focus balance value obtained during the aforementioned process of initial setting. For example, the threshold value f may be set to the value b shown in FIG. 2.

Figure 4:
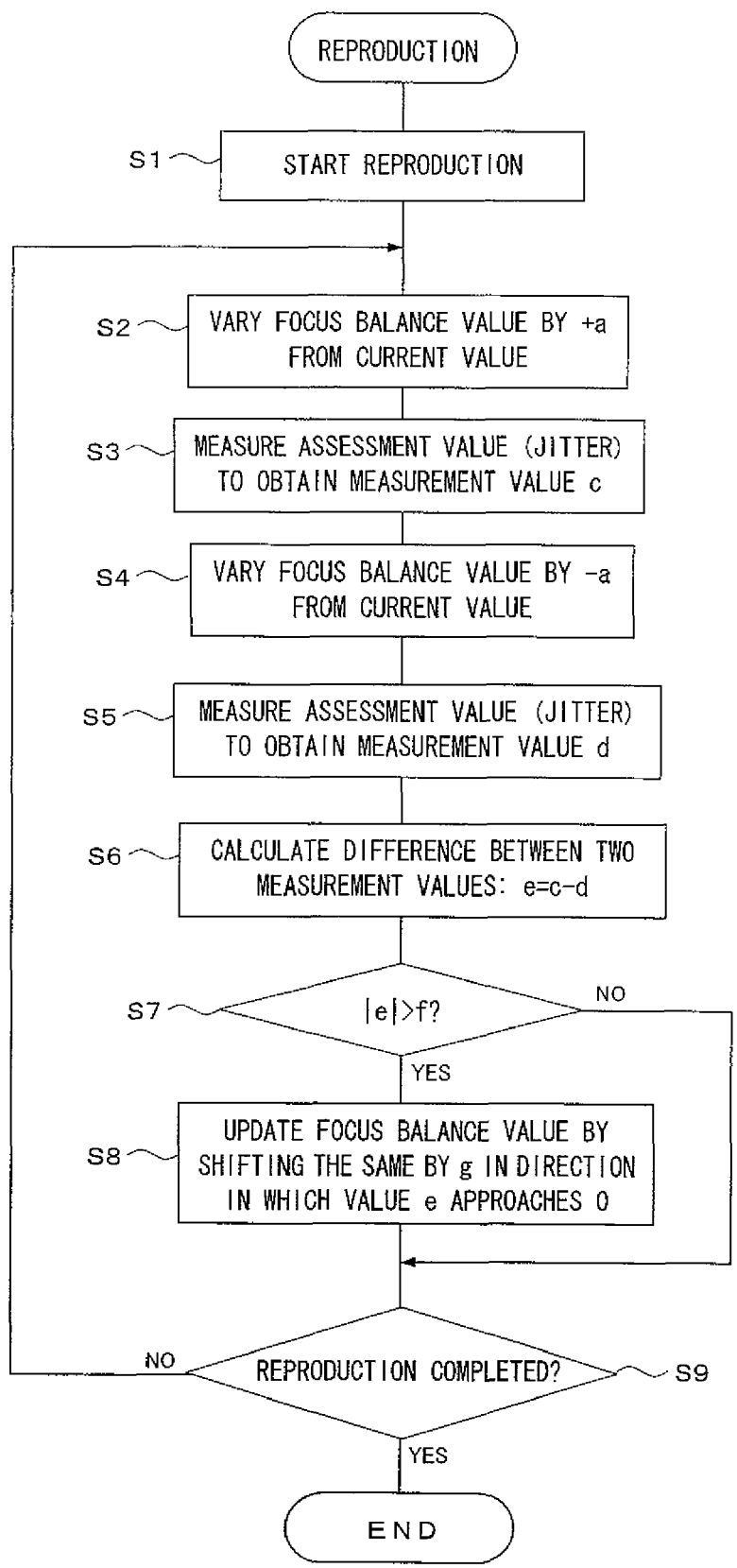
FIG. 4 is a flowchart showing a procedure for automatically adjusting the focus balance value during the reproduction operation.

FIG. 4 is a flowchart showing a procedure for automatically adjusting the focus balance value during the above-described reproduction operation. When the optical disc apparatus 1 begins the reproduction operation in step S1, the control unit 15 varies the focus balance value in the positive direction by +a from the currently set value in step S2, and the signal processing unit 13 measures the jitter in step S3. Next, the control unit 15 varies the focus balance value in the negative direction by −a in step S4, and the signal processing unit 13 again measures the jitter in step S5. Then, the control unit 15 calculates the difference e between two measurement values c and d (measured in steps S3 and S5) in step S6 and compares the difference e with the threshold value f in step S7. If the difference e exceeds the threshold value f (Yes in step S7), the control unit 15 shifts the current focus balance value by the specified amount g in a direction in which the value e approaches 0 to update the focus balance value in step S8. If the difference e does not exceed the threshold value f (No in step S7), the control unit 15 holds the current focus balance value without executing step S8. Subsequently, the control unit 15 judges whether the reproduction operation has been completed in step S9. If the reproduction operation has not been completed (No in step S9), the control unit 15 reverts to step S2 above and reexecutes the aforementioned procedure. When a command for terminating the reproduction operation is entered through the operating unit 16 (Yes in step S9), the control unit 15 terminates the reproduction operation.

Figure 5:
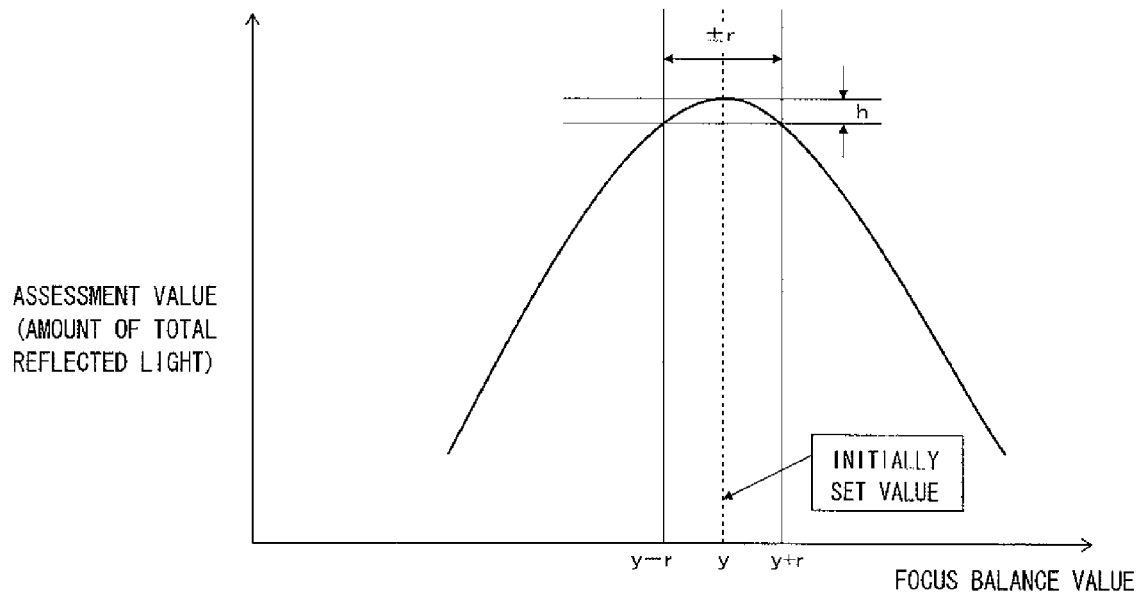
FIG. 5 is a diagram showing how the focus balance value is initially set for recording of information.
Figure 6:
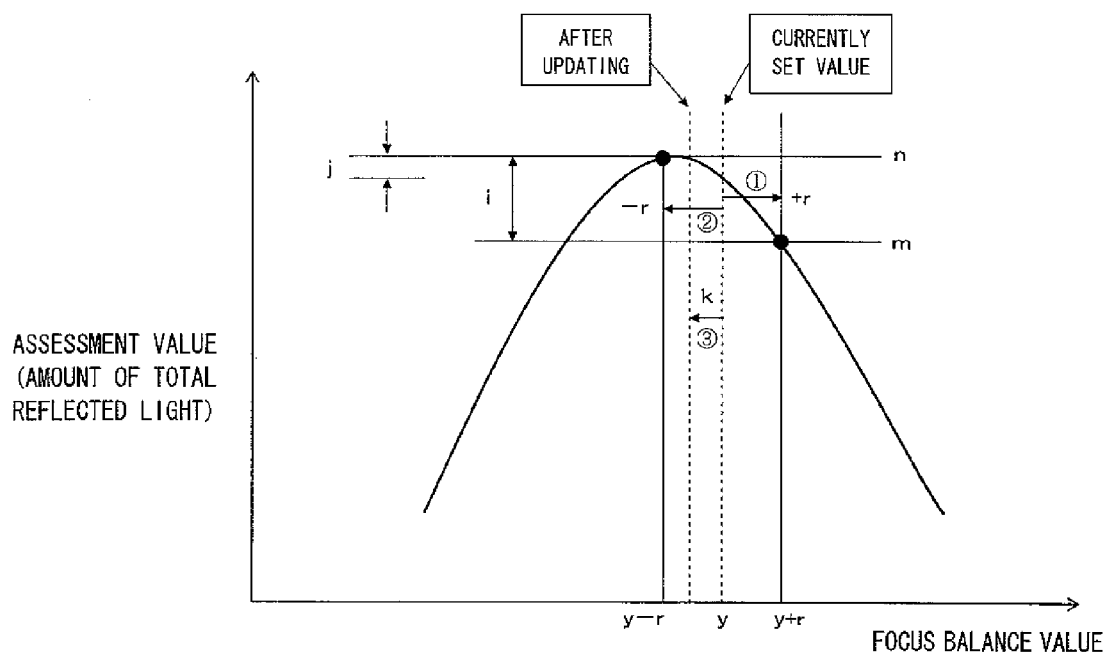
FIG. 6 is a diagram showing how focus balance adjustment is carried out during recording operation.

FIGS. 5 and 6 are diagrams illustrating a principle of focus balance adjustment performed during recording of information on the optical disc 10. FIG. 5 shows how the focus balance value is initially set for recording of the information. When the optical disc apparatus 1 spins up at booting, the optical pickup 12 projects laser light onto the optical disc 10 and, while the focus balance value is varied, the signal processing unit 13 measures the amount of total reflected light from the optical disc 10, whereby the optical disc apparatus 1 determines a point where the amount of total reflected light is maximized. The amount of the total reflected light is an example of an assessment value used in recording operation in this invention. As depicted in FIG. 5, the amount of the total reflected light is maximized when the focus balance value is equal to y, so that this focus balance value y is used as an initially set value. Then, the optical disc apparatus 1 determines a range y±r in which the amount of the total reflected light varies by an amount of h when the focus balance value is varied in both positive and negative directions from the initially set value y, where h is set within a range in which the recording operation is not affected in any way and values of y, r and h are stored in the memory of the control unit 15. At this point, initial setting of the focus balance value is completed.

Focus balance adjustment during the recording operation is now described with reference to FIG. 6. When the recording operation begins, the control unit 15 varies the focus balance value in the positive direction by +r from the currently set value (which is currently equal to the initial value y) as indicated by the circled numeral 1 in FIG. 6 and in the negative direction by −r as indicated by the circled numeral 2. As will be understood from the above discussion, "r" is set to a value at which the recording operation is not affected. The signal processing unit 13 measures the amounts of the total reflected light at both upper and lower limits of the range y±r. In an example shown in FIG. 6, the amount of the total reflected light is m when the focus balance value is set to y+r and the amount of the total reflected light is n when the focus balance value is set to y−r. The control unit 15 calculates a difference i=n−m between these amounts of the total reflected light and, if the value i exceeds a threshold value j, the control unit 15 shifts the current focus balance value y by a specified amount k in a direction in which the value i approaches 0 as indicated by the circled numeral 3, thereby updating the focus balance value. The focus balance value thus updated (y−k in this example) is now a new current focus balance value. After the new current focus balance value is determined, the control unit 15 again varies the new focus balance value in the positive direction by +r and in the negative direction by −r, and the signal processing unit 13 measures the amounts of the total reflected light at both the upper and lower limits of the range y±r. Then, if the difference i between the measured amounts of the total reflected light exceeds the threshold value j, the control unit 15 again updates the current focus balance value by shifting the same by the specified amount k. If the difference i does not exceed the threshold value j, on the contrary, the control unit 15 holds the current focus balance value as it is without updating.

While scanning the optical disc 10 all the way from inner tracks to outer tracks thereof, the optical disc apparatus 1 continually updates the focus balance value in real time to automatically adjust the focus balance by repeating the aforementioned sequence until the recording operation is completed.

The amount of the total reflected light exhibits a characteristic represented roughly by a quadratic curve when the focus balance value is varied. Therefore, the amount of the total reflected light does not vary so greatly when the focus balance value is altered to some extent around an optimum value thereof, while a small change in the focus balance value can result in a large variation in the amount of the total reflected light and consequent deterioration of data recording performance when the focus balance value is set apart from the optimum value. For this reason, the control unit 15 varies the current focus balance value in both the positive and negative directions within the range in which the recording operation is not affected and the control unit 15 updates the focus balance value by shifting the same in the direction in which the value i approaches 0 when the difference i between the measured amounts of the total reflected light exceeds the threshold value j as discussed above. This approach of the invention serves to suppress variations in the amount of the total reflected light and prevent deterioration of the data recording performance. Additionally, this approach makes it possible to prevent rapid variations in the focus balance value since the focus balance value is updated by the specified amount k at one time. The aforementioned value of k should preferably be so selected that the amounts of changes in the total reflected light in the positive and negative directions obtained after the focus balance value is updated would become equal to each other.

The optical disc apparatus 1 need not necessarily carry out the above-described automatic adjustment of the focus balance value in the recording operation when recording control information on inner tracks of the optical disc 10 or carrying out optical power calibration (OPC) for laser light power adjustment. Also, the threshold value j may be set to a fixed value and stored in the memory of the control unit 15 in advance or determined in accordance with results of adjustment of the focus balance value obtained during the aforementioned process of initial setting. For example, the threshold value j may be set to the value h shown in FIG. 5.

Figure 7:
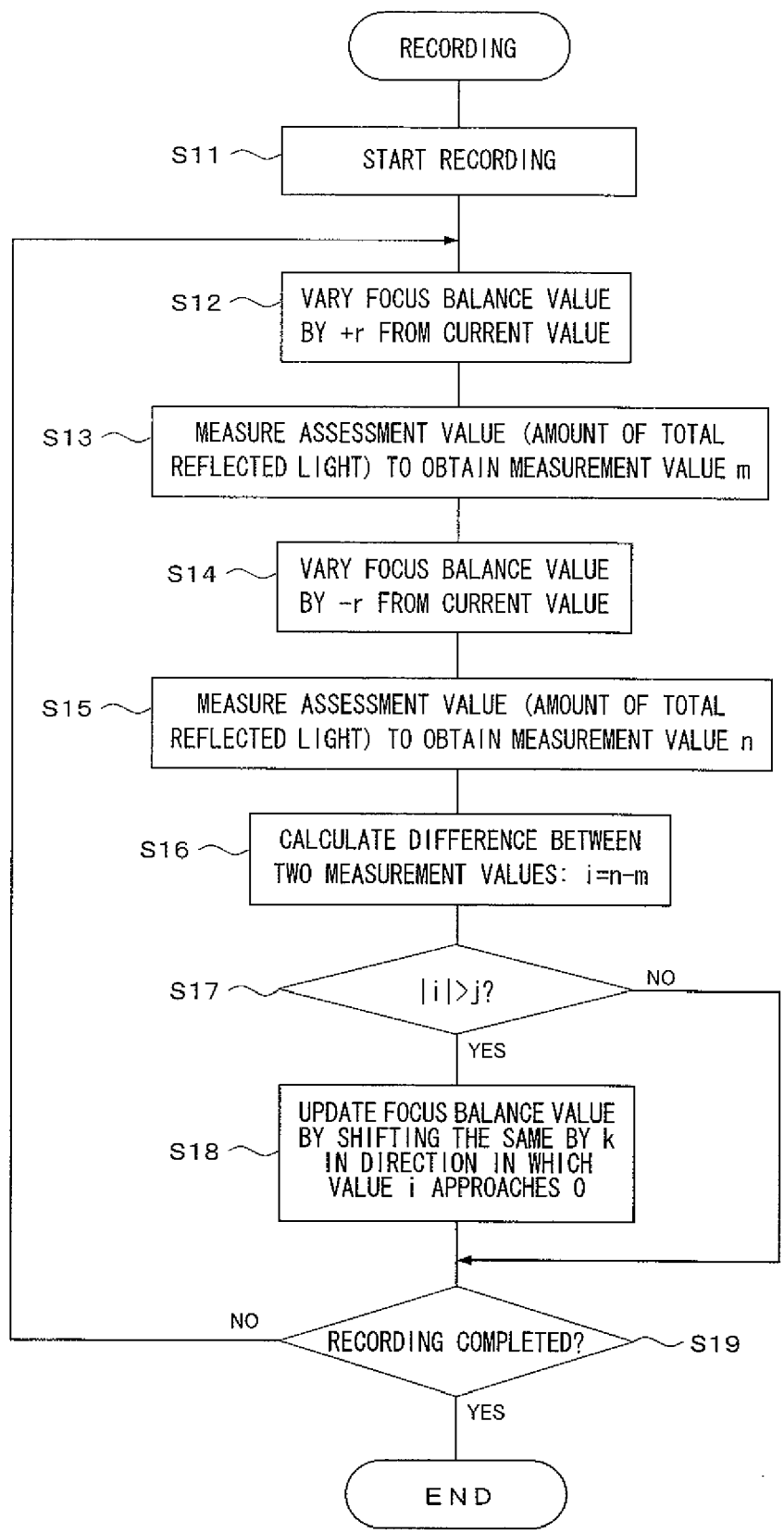
FIG. 7 is a flowchart showing a procedure for automatically adjusting the focus balance value during the recording operation.

FIG. 7 is a flowchart showing a procedure for automatically adjusting the focus balance value during the above-described recording operation. When the optical disc apparatus 1 begins the recording operation in step S11, the control unit 15 varies the focus balance value in the positive direction by +r from the currently set value in step S12, and the signal processing unit 13 measures the amount of the total reflected light in step S13. Next, the control unit 15 varies the focus balance value in the negative direction by −r in step S14, and the signal processing unit 13 again measures the amount of the total reflected light in step S15. Then, the control unit 15 calculates the difference i between two measurement values m and n (measured in steps S13 and S15) in step S16 and compares the difference i with the threshold value j in step S17. If the difference i exceeds the threshold value j (Yes in step S17), the control unit 15 shifts the current focus balance value by the specified amount k in a direction in which the value i approaches 0 to update the focus balance value in step S18. If the difference i does not exceed the threshold value j (No in step S17), the control unit 15 holds the current focus balance value without executing step S18. Subsequently, the control unit 15 judges whether the recording operation has been completed in step S19. If the recording operation has not been completed (No in step S19), the control unit 15 reverts to step S12 above and reexecutes the aforementioned procedure. When a command for terminating the recording operation is entered through the operating unit 16 (Yes in step S19), the control unit 15 terminates the recording operation.

As thus far described, the optical disc apparatus 1 of the embodiment automatically updates the focus balance value to an optimum value all along inner tracks to outer tracks of the optical disc 10 while recording or reproducing information thereon. This arrangement of the invention makes it possible to correctly record and reproduce the information even on warped discs, thereby ensuring improved quality of recording and reproduction operations.

Figure 8:
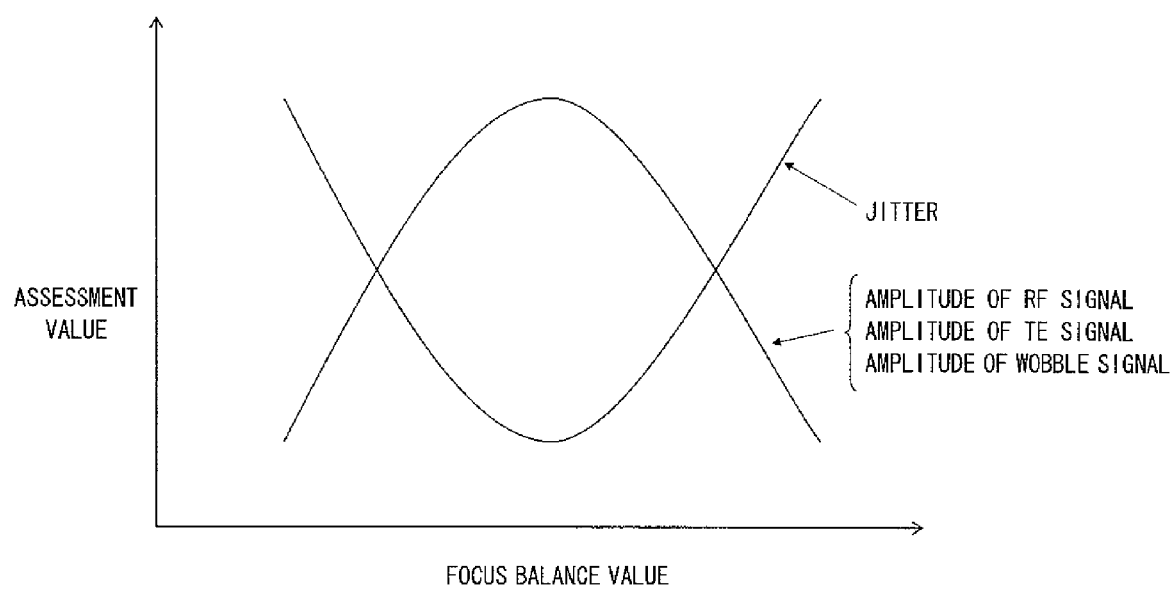
FIG. 8 is a diagram showing characteristics of signals which may be used as an assessment value in the reproduction operation.

While the foregoing embodiment uses the jitter of the reproduced signal as the assessment value in the reproduction operation, the invention is not limited to this arrangement. For example, amplitude of the RF signal, the tracking error signal or a wobble signal may be used as the assessment value. FIG. 8 is a diagram showing characteristics of signals which may be used as the assessment value in the reproduction operation. Compared to the characteristic of the jitter, the characteristics of the RF signal, the tracking error (TE) signal and the wobble signal are reversed like that of the aforementioned amount of the total reflected light. Therefore, when one of these signals is used as the assessment value in the reproduction operation, it is possible to update the focus balance value according to the same principle as illustrated in FIGS. 5 and 6.

What is claimed is:

1. An optical disc apparatus which is configured to project laser light from an optical pickup onto an optical disc, detect part of the laser light reflected from the optical disc and perform focus control of the optical pickup based on a detection signal thus obtained, said optical disc apparatus comprising:

a measuring device for measuring assessment values during reproduction operation based on signals reproduced when a focus balance value is varied in both positive and negative directions from a currently set value thereof by an amount which does not affect the reproduction operation;

a calculator for calculating a difference between the assessment values measured by said measuring device; and an updater for updating the current focus balance value by varying the same in a direction in which the difference between the assessment values calculated by said calculator approaches 0 if said difference exceeds a specified threshold value.

2. The optical disc apparatus according to claim 1, wherein the focus balance value is continually updated in real time from inner tracks to outer tracks of the optical disc by repeating said measuring of the assessment values by varying the focus balance value, said calculating of the difference between the assessment values, and said updating of the current focus balance value until the reproduction operation is completed.

3. An optical disc apparatus which is configured to project laser light from an optical pickup onto an optical disc, detect part of the laser light reflected from the optical disc and perform focus control of the optical pickup based on a detection signal thus obtained, said optical disc apparatus comprising:

a measuring device for measuring assessment values during recording operation based on signals recorded when a focus balance value is varied in both positive and negative directions from a currently set value thereof by an amount which does not affect the recording operation;

a calculator for calculating a difference between the assessment values measured by said measuring device; and an updater for updating the current focus balance value by varying the same in a direction in which the difference between the assessment values calculated by said calculator approaches 0 if said difference exceeds a specified threshold value.

4. The optical disc apparatus according to claim 3, wherein the focus balance value is continually updated in real time from inner tracks to outer tracks of the optical disc by repeating said measuring of the assessment values by varying the focus balance value, said calculating of the difference between the assessment values, and said updating of the current focus balance value until the recording operation is completed.

5. An optical disc apparatus which is configured to project laser light from an optical pickup onto an optical disc, detect part of the laser light reflected from the optical disc and perform focus control of the optical pickup based on a detection signal thus obtained, said optical disc apparatus comprising:

a first measuring device for measuring assessment values during reproduction operation based on signals reproduced when a focus balance value is varied in both positive and negative directions from a currently set value thereof by an amount which does not affect the reproduction operation;

a first calculator for calculating a difference between the assessment values measured by said first measuring device;

a first updater for updating the current focus balance value by varying the same in a direction in which the difference between the assessment values calculated by said first calculator approaches 0 if said difference exceeds a specified threshold value;

a second measuring device for measuring assessment values during recording operation based on signals recorded when the focus balance value is varied in both the positive and negative directions from the currently set value thereof by an amount which does not affect the recording operation;

a second calculator for calculating a difference between the assessment values measured by said second measuring device; and a second updater for updating the current focus balance value by varying the same in a direction in which the difference between the assessment values calculated by said second calculator approaches 0 if said difference exceeds a specified threshold value.

6. The optical disc apparatus according to claim 5, wherein the focus balance value is continually updated in real time from inner tracks to outer tracks of the optical disc by repeating said measuring of the assessment values by varying the focus balance value, said calculating of the difference between the assessment values, and said updating of the current focus balance value until the reproduction operation or the recording operation is completed.

7. A method of adjusting focus balance of an optical disc apparatus which is configured to project laser light from an optical pickup onto an optical disc, detect part of the laser light reflected from the optical disc and perform focus control of the optical pickup based on a detection signal thus obtained, said method comprising:

measuring assessment values during reproduction operation based on signals reproduced when a focus balance value is varied in both positive and negative directions from a currently set value thereof by an amount which does not affect the reproduction operation;

calculating a difference between the assessment values measured during the reproduction operation;

updating the current focus balance value by varying the same in a direction in which the difference between the assessment values calculated during the reproduction operation approaches 0 if said difference exceeds a specified threshold value;

measuring assessment values during recording operation based on signals recorded when the focus balance value is varied in both the positive and negative directions from the currently set value thereof by an amount which does not affect the recording operation;

calculating a difference between the assessment values measured during the recording operation; and updating the current focus balance value by varying the same in a direction in which the difference between the assessment values calculated during the recording operation approaches 0 if said difference exceeds a specified threshold value.

8. The method according to claim 7, wherein the focus balance value is continually updated in real time from inner tracks to outer tracks of the optical disc by repeating said measuring of the assessment values by varying the focus balance value, said calculating of the difference between the assessment values, and said updating of the current focus balance value until the reproduction operation or the recording operation is completed.

* * * * *